Figure 1:
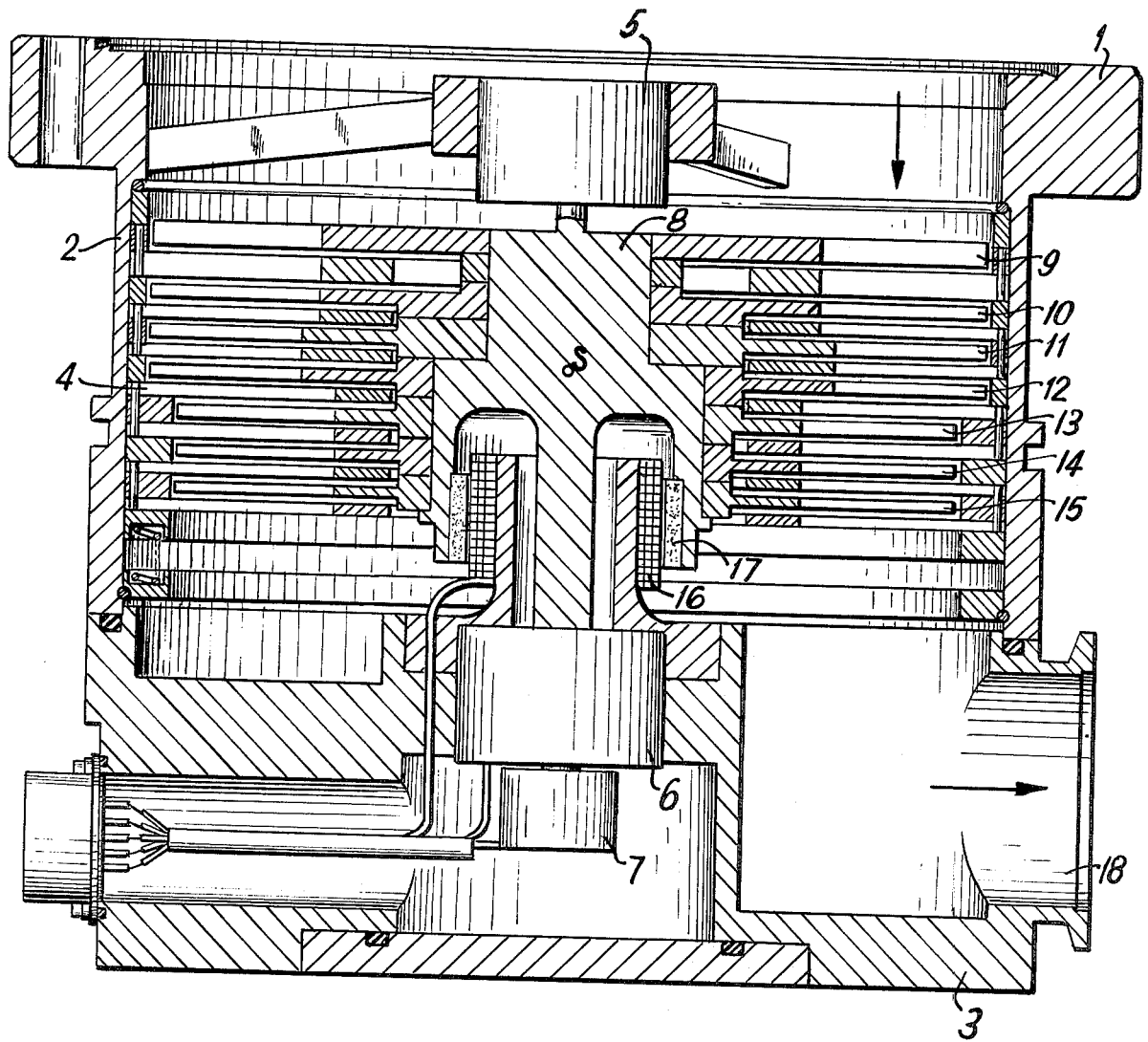

United States Patent [19]

Becker et al.

[11] 4,111,595
[45] Sep. 5, 1978

[54] TURBOMOLECULAR PUMP WITH MAGNETIC MOUNTING

[75] Inventors: Willi Becker, Braunfels; Wilfried Nesseldreher, Heuchelheim, both of Germany

[73] Assignee: Arthur Pfeiffer Vakuumtechnik Wetzlar GmbH, Asslahr, Germany

[21] Appl. No.: 747,298

[22] Filed: Dec. 3, 1976

[30] Foreign Application Priority Data

Dec. 6, 1975 [DE] Fed. Rep. of Germany ....... 2554995

[51] Int. Cl.$^2$ .............................................. F01D 1/26
[52] U.S. Cl. ...................................... 415/90; 417/354; 417/424
[58] Field of Search ................... 415/90; 417/424, 353, 417/354

[56] References Cited

U.S. PATENT DOCUMENTS

| 3,168,977 | 2/1965 | Garnier et al. | 415/90 |
| 3,748,055 | 7/1973 | Becker | 415/90 |
| 4,023,920 | 5/1977 | Bachler et al. | 417/354 |
| 4,036,565 | 7/1977 | Becker | 415/90 |

Primary Examiner—C. J. Husar
Attorney, Agent, or Firm—Toren, McGeady and Stanger

[57] ABSTRACT

In the casing of a turbo-molecular pump there is a suction port at the suction side, and a discharge port at the discharge side. A stator is arranged in the casing and a rotor is journaled therein in magnetic bearings. The rotor is provided with rotor discs which are axially arranged along the longitudinal axis of the rotor, each of the rotor discs having vanes. The axial thickness and the outer diameter of each of the discs of the rotor are dimensioned so that the moment of inertia of the rotor about its axis of rotation exceeds its moment of inertia about a transverse axis through its center of gravity. Additionally, the vanes of the rotor disc adjacent the suction side of the pump are long and thin relative to the vanes of the other rotor discs of the rotor, and the diameter and thickness of the rotor disc adjacent the suction side of the pump is large relative to the diameter and thickness of the other rotor discs of the rotor.

5 Claims, 2 Drawing Figures

TURBOMOLECULAR PUMP WITH MAGNETIC MOUNTING

The present invention relates to a turbo-molecular pump with its rotor journalled in magnetic bearings.

A turbo-molecular pump is a vacuum pump having a rapidly rotating rotor. The characteristic parameters of the pump i.e. the pressure ratio and the suction capacity are dependent to a great extent on the circumferential speed and, accordingly with given structural dimensions, on the rotational speed. One therefore tries to increase the rotational speed as much as permitted by the strength of the rotor material.

The most favorable solution of the problem of journalling the rotor is through the use of magnetic bearings. One must distinguish active and passive magnetic bearings; while a passive bearing is constituted by permanent magnets and, as the case may be, by soft-iron components, an active magnetic bearing requires coils and control members. Because gases are given off by such coils, it is necessary to arrange the active bearing elements of a turbo-molecular pump on the forevacuum side of the pump. Only passive magnetic bearings may be arranged at the high-vacuum side of the pump.

A particularly simple construction results when in a uniflow arrangement a passive magnetic bearing is arranged at the high-vacuum side, and an active magnetic bearing on the forevacuum side of a turbo-molecular pump. The invention is not, however, necessarily limited to such an embodiment.

Magnetic bearings are comparatively soft as compared for example with ball bearings. Consequently the rotor may perform various oscillations which correspond to the freedoms of movement of a weakly coupled giro. An oscillation, which may be particularly disturbing, is the so-called nutation oscillation. In the first approximation the nutation frequency can be calculated as follows:

$$f_N = f_R \cdot (I_a/I_q) \quad (1)$$

wherein $f_N$ is the nutation frequency, $f_R$ is the rotational frequency, $I_R$ is the moment of inertia about the axis of rotation, and $I_q$ is the moment of inertia about a transverse axis, in which the latter is to be understood as being perpendicular to the axis of rotation and passing through the centre of gravity of the rotor.

In the embodiments of hitherto known turbo-molecular pumps having magnetic bearings the moment of inertia about the transverse axis is substantially larger than the moment of inertia about the axis of rotation. This seems that the nutation frequency is below the rotational frequency. Owing to the coupling constituted by the magnetic bearings the nutation frequencies at low rotational speeds lies slightly above the rotational frequency. When accelerating from standstill to operational speed one has accordingly to pass through the nutation frequency whereby a strong resonance is established. This resonance is generally damped by electronic means.

It is an object of the present invention to provide a bearing arrangement of the foregoing type which is as simple as possible and in which such damping means may be dispensed with.

According to the invention the rotor is constructed so that its moment of inertia about the axis of rotation exceeds the moment of inertia about the transverse axis. This means that, in accordance with equation (1), the nutation frequency always lies above the rotational frequency, and is accordingly never reached or to be passed through.

Hereinafter the individual features will be described which lead to the construction of a rotor according to the present invention:

In order to keep the moment of inertia about the transverse axis as low as possible, the rotor has to be very short. In order to attain the pressure ratio required, there is, however, a certain number of discs necessary. Accordingly, the thickness of the discs in the axial direction has to be kept as small as possible. Thin discs have, however, the disadvantage of having a low volume flow rate. The volume flow rate of the pump as a whole is substantially determined by the rotor disc at the high vacuum end of the pump. This last disc and, as the case may be, also the adjacent one, is accordingly made substantially thicker than the subsequent discs. Moreover, the vanes are to be made as long and thin as technically possible. Thereby, likewise, a high volume flow rate is attained.

In order to attain a high moment of inertia about the axis of rotation, the rotor discs in the vicinity of the center of gravity of the rotor are provided with vanes which are as short and as thick as possible.

The rotor discs at the discharge side of the pump have smaller diameters and shorter and lighter vanes. Thereby the moment of inertia about the transverse axis is kept as small as possible.

A further improvement is attained when the hub portions at the interstices between the rotor discs are made, in the vicinity of the center of gravity of the rotor, with as large a diameter as possible, and at the interstices near the ends of the rotor, with as small a diameter as possible.

Figure 2:
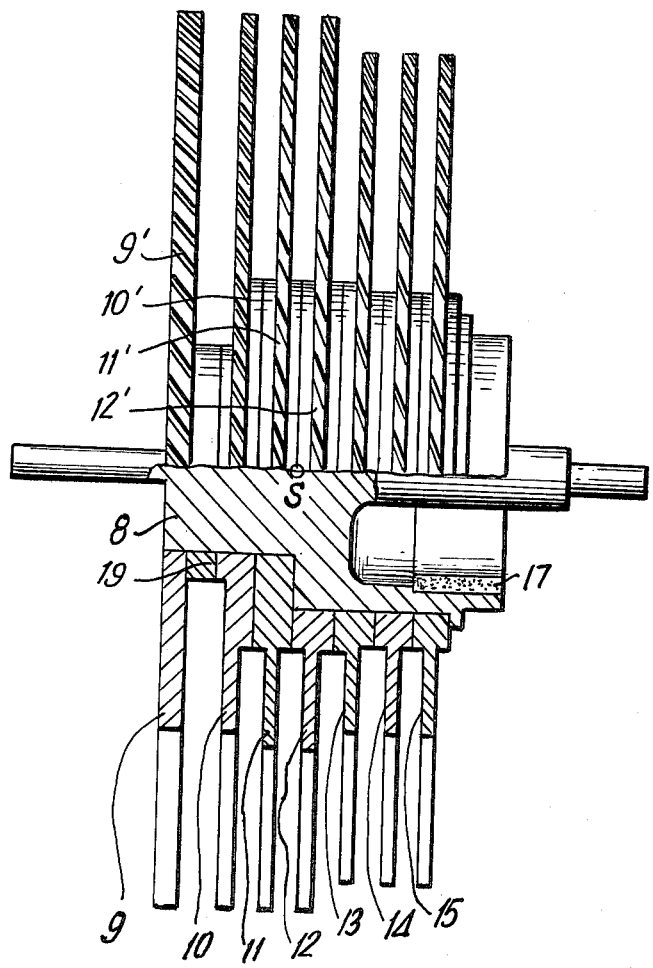

The invention will now be described in more detail by way of example with reference to the accompanying drawings, in which:

FIG. 1 is a longitudinal section of an embodiment of a turbo-molecular pump according to the invention; and FIG. 2 shows the rotor of said pump half in section and half in outside view, the former showing the lengths of the vanes, and the latter showing the difference thicknesses of the vanes of the various rotor discs.

Referring to FIG. 1, the turbo-molecular pump is shown in a vertical position, but it could alternatively be operated in a horizontal position. The cylindrical casing portion 2 having a suction port 1 rests on a base 3. In the cylindrical portion 2 there is arranged a stator 4 comprising the guide vane discs. The upper, passive, magnetic bearing 5 is, for example, supported by three arms. The lower, active, magnetic bearing 6 and the control unit 7 are fixed to the base 3. The rotor 8 comprising the rotor discs 9 to 15 is journalled in the magnetic bearings. For driving the rotor, there is provided a motor formed by a stator 16 and magnets or a squirrel cage armature 17. The gas to be evacuated enters through the suction port 1 into the first rotor disc 9, is there compressed in co-operation with a stator disc 4, and after passing through all the remaining rotor and stator discs is discharged through the fore-vacuum port 18.

FIG. 2 shows the rotor, in section in the lower half, and in lateral elevation in the upper half. It will be seen that the first rotor disc 9, adjacent the high-vacuum side, is substantially thicker in the axial direction than the other rotor discs. The vanes 9' of this rotor disc are long (see lower half of FIG. 2) and thin (see upper half of FIG. 2). The rotor disc 10 has the same diameter as the rotor disc 9 but is of smaller thickness, and has likewise thin vanes 10'.

The hub-like portion at the interstice between said rotor disc 10 and the next rotor disc 11 has a substantially larger diameter than the ring 19 between the rotor discs 9 and 10.

The rotor discs 11 and 12 are provided with shorter and thicker vanes 11' and 12' of the same outer diameter as those of the rotor discs 9 and 10. The hub-like portions at the interstices have here likewise a larger diameter than the ring 19 in the interstice between the rotor discs 9 and 10.

The rotor discs 13, 14 and 15 have smaller outer diameters than the rotor discs 9 to 12 and have shorter and thin vanes. The hub-like portions at the interstices between the rotor discs 13, 14 and 14, 15, respectively, are likewise of smaller diameters than those between the rotor discs 10, 11 and 11, 12 or 12, 13.

By these features it is achieved that the moment of inertia of the rotor about the transverse axis through the center of gravity S is smaller than its moment of inertia about the axis of rotation.

While specific embodiments of the invention have been shown and described in detail to illustrate the application of the inventive principles, it will be understood that the invention may be embodied otherwise without departing from such principles.

What is claimed is:

1. A turbo-molecular pump, comprising a casing having a suction side and a discharge side, a suction port at said suction side and a discharge port at said discharge side, a stator arranged in said casing, and a rotor journaled therein in magnetic bearings, said rotor having rotor discs arranged axially along the longitudinal axis of said rotor, each rotor disc having vanes, said rotor having discs positioned adjacent said suction side, adjacent said discharge side and positioned in the vicinity of the center of gravity which have relative axial thicknesses and diameters to produce a moment of inertia of the rotor about its axis of rotation which exceeds its moment of inertia about a transverse axis through its center of gravity.

2. The turbo-molecular pump according to claim 1 wherein the rotor disc positioned adjacent the suction side of said casing has an outer diameter and an axial thickness which is large relative to the outer diameter and axial thickness of other rotor discs of said rotor, and wherein said rotor disc positioned adjacent the suction side of said pump has vanes which are long and thin relative to the vanes of other rotor discs of said rotor.

3. The turbo-molecular pump according to claim 1 wherein the rotor discs positioned in the vicinity of the center of gravity of said rotor have vanes which are relatively thick and short, the outer diameters of the rotor discs positioned in the vicinity of the center of gravity being substantially equal to the outer diameter of the disc adjacent the suction side of said casing.

4. The turbo-molecular pump according to claim 1 wherein the rotor discs positioned adjacent the discharge side of said casing have outer diameters smaller than the outer diameters of the rotor discs adjacent the suction side of said casing and of those positioned in the vicinity of the center of gravity of the rotor, and said rotor discs adjacent said discharge side of said casing having relatively thin vanes.

5. The turbo-molecular pump according to claim 1 wherein said rotor has hub-like portions, said hub-like portions having diameters which are as large as possible at the interstices between the rotor discs positioned in the vicinity of the center of gravity of the rotor, and said hub-like portions located at the interstices between the rotor discs adjacent the suction side of said casing and those positioned adjacent the discharge side of said casing having a diameter which is as small as possible.

* * * * *